(12) United States Patent
Schiffmiller et al.

(10) Patent No.: US 7,315,280 B2
(45) Date of Patent: *Jan. 1, 2008

(54) COHERENT GEOLOCATION SYSTEM

(75) Inventors: Richard Schiffmiller, Teaneck, NJ (US); Henry Adler, New York, NY (US); Melvin Carroll, Flushing, NY (US)

(73) Assignee: BAE Systems Information and Electronics Systems Integration Inc., Nashua, NH (US)

( * ) Notice: Subject to any disclaimer, the term of this patent is extended or adjusted under 35 U.S.C. 154(b) by 515 days.

This patent is subject to a terminal disclaimer.

(21) Appl. No.: 10/853,693

(22) Filed: May 25, 2004

(65) Prior Publication Data

US 2005/0275588 A1 Dec. 15, 2005

(51) Int. Cl.
*G01S 1/24* (2006.01)

(52) U.S. Cl. ............................... 342/387; 342/442

(58) Field of Classification Search ............... 342/387, 342/442, 443, 444, 457, 463
See application file for complete search history.

(56) References Cited

U.S. PATENT DOCUMENTS

| 5,119,104 A * | 6/1992 | Heller ................... 342/450 |
| 5,191,342 A * | 3/1993 | Alsup et al. ............. 342/465 |
| 5,708,443 A * | 1/1998 | Rose ..................... 342/442 |
| 2004/0002347 A1 * | 1/2004 | Hoctor et al. ........... 455/456.1 |
| 2004/0203870 A1 * | 10/2004 | Aljadeff et al. ......... 455/456.1 |

* cited by examiner

*Primary Examiner*—Dao Phan
(74) *Attorney, Agent, or Firm*—Robert K. Tendler

(57) ABSTRACT

A coherent TOA system is provided for rapidly ascertaining the position of a pulse train emitter such as a radar. Techniques are provided to estimate the underlying repetition interval of the emitter and to do the TOA processing knowing which of the particular pulses is being detected at a collector, thus surmounting the effect of gaps in the received pulse stream. The subject system is preferable to conventional time-difference-of-arrival geolocation systems which require that each of the collecting platforms measure the same pulse from the emitter, and also to non-coherent TOA systems whose accuracy is less than that achievable with the subject coherent system for the same amount of data.

19 Claims, 5 Drawing Sheets

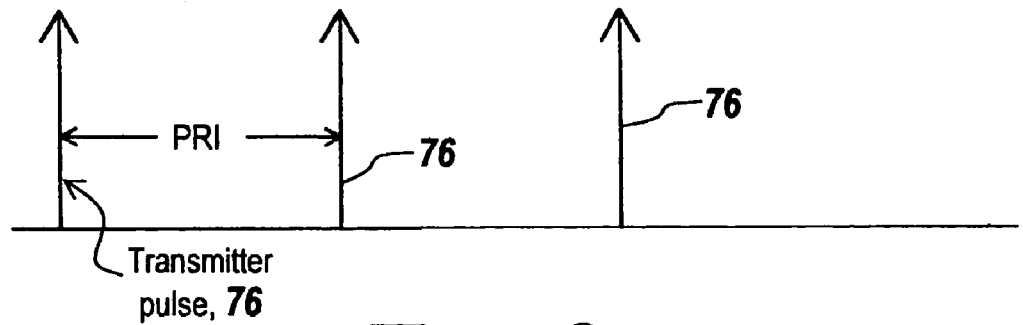
*Fig. 2*
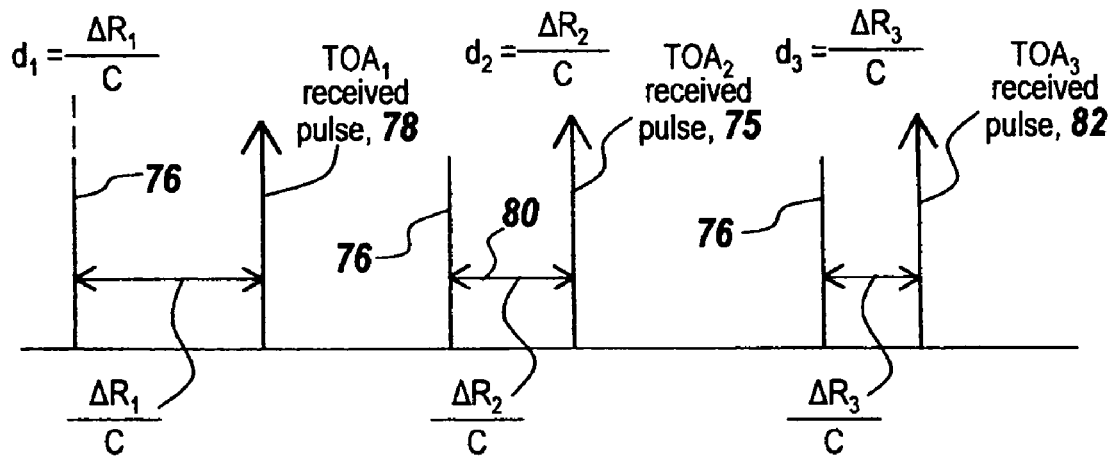
*Fig. 3*
$$TOA_i = T_0 + \frac{\Delta R_i}{C} + \underbrace{(n_i - 1) PRI}_{\equiv (N_i - 1) Q}$$
*Fig. 4*

$\Delta R_1, \Delta R_2, \Delta R_3 \Rightarrow x_e, y_e, z_e$

COHERENT GEOLOCATION SYSTEM

FIELD OF THE INVENTION

This invention relates to geolocation and more particularly to a system for rapidly determining the location of a pulsed waveform emitter such as a radar.

BACKGROUND OF THE INVENTION

It is tactically important for a military aircraft that is overflying an enemy territory and detecting pulsed radiation from a radar to be able to locate the position of the radar so that the radar can either be destroyed, avoided or countermeasured. Two classes of time-based methods have been used in the past to geolocate a radar. The first utilizes time difference of arrival (TDOA) of radar pulses, measured either across two antennas of a single aircraft, or across multiple aircraft. The second measures the time of arrival (TOA) of a radar's pulses at a single platform in a non-coherent fashion by averaging data taken from a number of snippets of data called dwells. This system exploits the varying inter-pulse intervals due to movement of the platform from one position to another.

In both of the above cases the accuracy of the geolocation depends on the distance or baseline between the collectors used to detect the emitted pulses. Note that the longer the baseline, the better will be the location accuracy.

Time-difference-of-arrival systems, while useful, require that the same pulses be detected by multiple collectors and that the collectors know which pulses on one platform correspond to which on the others. Note that for TDOA systems it is assumed that all collectors are receiving the same pulses. However, if a collector does not know which of a series of pulses it is receiving, this can lead to ambiguous geolocations. For TDOA systems, if the collectors do not detect the same pulse, the position of the emitting device cannot be accurately ascertained by the here-to-fore used methods.

Measuring the same pulses on multiple platforms is difficult to achieve. This is because there may be physical obstructions that block a platform's line of sight to an emitter so that pulses detected by one aircraft may not be detected by the others. Also, the collectors' receivers may not be tuned to the same frequency bands at the same time, and so will not detect the same pulses from the emitter. Moreover, the collecting system may not have the sensitivity to see the pulses from a scanning radar when the collector is not illuminated by the radar's main beam.

As to TOA systems, prior time-of-arrival systems that use non-coherent processing operate on snippets or dwells of data, with many snippets of data collected over many tens of seconds of flight in an attempt to establish a long baseline. This prior method measures the times of arrival associated with each snippet independent of the others and then averages the time-of-arrival results. This approach is called "non-coherent" processing as it does not exploit any possible long time uniformity or coherency across the snippets of data. Pulse data is coherent over a period only if there is some constancy in the radar emission process over that period, e.g., the pulse repetition interval (PRI) does not change.

As to PRI, typically the emitter's PRI is often purposely varied depending on the mode of operation or is inherently unstable over time. Thus, the reason for using short snippets of data in the past was to assure that the radar's PRI did not change over the measurement or that there are no gaps in receipt of the pulses, thereby assuring coherency at least over the snippet.

Note that when only a small snippet of data is considered the baseline associated with the data is exceedingly short. This means that any geolocation using the snippet alone will be unacceptably error-prone. Averaging the times of arrival in a dwell and using those average values to extend the baseline in non-coherent processing does not produce geolocation results that are nearly as accurate as coherent processing.

To summarize, processing the data non-coherently involves averaging the time-of-arrival results over each short snippet of data and finding a location for those values. Any coherent processing that is done occurs only over the short snippets involving short collection periods or dwells. Because of this, the resultant geolocation has limited accuracy despite averaging snippets over prolonged data collection periods.

SUMMARY OF THE INVENTION

There is, however, a method for accurately determining the position of a pulsed source such as a radar without using non-coherent time-of-arrival techniques. In the subject method a coherent time-of-arrival technique is used which compensates for changes in PRI and also for gaps in the pulse stream either due to emitter antenna rotation, poor receiver sensitivity or physical blockage of the emitted pulses.

It will be appreciated that in order to relate time-of-arrival measurement of a pulse to the location of the radar, one must know the time that pulse was emitted from the radar, the location of the collector when it received the pulse, and the precise time of transit (which may be converted to a distance by multiplying by the speed of light) of the pulse from the radar to the collector.

Coherent time-of-arrival processing involves collecting an entire ensemble of data, which in one embodiment may be over many seconds to establish a relatively long baseline on which to calculate an accurate geolocation for the emitter. This is achieved without non-coherently processing the collected data.

In order to exploit coherency over all of the collected data and overcome changes in PRI or the effects of gaps, the subject technique identifies the pulse number in the received pulse train that the receiver at a collector is processing. This permits identifying which pulses are actually received. Knowing which pulse in a stream of pulses is received permits eliminating the gap effect so that the processing can pick up when pulses are again received.

More particularly, in one embodiment an aircraft's receiver is moved from one location to the next to provide a long baseline. Readings of the times of arrival of the received pulses are taken at numerous locations along the travel path of the aircraft, usually once a second.

The pulses processed at a location are those that are received in a predetermined time called a dwell. Typical dwells are in the 10–20-millisecond range, with measurements being taken when the receiver "parks" at a particular frequency interval.

It will be appreciated that the moving aircraft is in a different location when it collects each dwell. The times of arrival data from all the dwells are processed as one unit or ensemble, under the assumption that the radar is maintaining coherency, i.e., that there is a fundamental continuous repetition interval, Q, that does not change. It can be shown that techniques are available to accurately characterize Q over long periods of time, thus to be able to coherently process data from large numbers of dwells to establish a long baseline. It can also be shown that there are techniques to identify the pulse number of the pulse that the receiver is receiving.

Coherent processing of the data may take as much as 30 or 40 seconds of dwells involving approximately 30 to 60 10-millisecond dwells. Unlike non-coherent averaged systems, the ability to use a full 30 or 40 seconds of processing enables greater location accuracy for the same amount of data due to the longer baseline. For instance, the circular error of probability (CEP) for non-coherent processing over 40 seconds exceeds 80% of range. For coherent processing using the same geometry, the CEP drops below 5% of range and does so within 11–12 seconds, finally dropping to less than 0.5% of range at 40 seconds.

Note that the processing time and accuracy depend on the velocity and flight path of the aircraft with respect to the emitter, "the geometry," the accuracy of the time-of-arrival measurements and the accuracy of the measurement of the position of the collecting antenna.

The subject geolocating process may be understood by considering the following scenario: As the collector moves closer to the emitter, the difference between the times of arrival of two successive pulses is shorter than the difference between transmission times of the same two pulses at the emitter. Conversely, as the collector moves farther away from the emitter, the difference between the times of arrival of two successive pulses is longer than the difference between the transmission times of the same two pulses at the emitter.

Put another way, the interval of time between the arrival of pulses (inter-pulse spacing) at two different collection positions gets shorter as the collector moves closer to the emitter as opposed to when the collector moves farther away from the emitter, which results in lengthening of the inter-pulse interval. In general, there will be combinations of "moving closer" and "moving farther away" inter-pulse intervals as the flight progresses that completely specify the location of the emitter.

If one knows what the pulse repetition interval is at the emitter, and one knows the position of the collector at the time it measures each pulse's arrival, then only one point on the ground will satisfy the pattern of changing inter-pulse intervals measured by the collector. By coherently processing the times of arrival of pulses from an emitter, one can geolocate the emitter more precisely than by non-coherently combining and averaging the time-of-arrival data.

Coherent processing includes techniques to be able to specify the underlying constant repetition interval (Q) of the emitter. The coherency is maintained in the receiver by associating an integer with Q for each pulse being processed.

Thus, for coherent processing, one must be able to know the Q value of the emitter and use it to know what pulse in a train is being received. With knowledge of the emitter's Q value and the identity of the pulse received one can achieve coherent processing.

One must be able to identify which pulse in a pulse train one is measuring. This is done by a process which derives an integer N, related to Q, for each received pulse.

The difficulty with maintaining coherent processing of time-of-arrival data is that there are gaps in time when no pulses are arriving, i.e., between dwell collects. Typical dwell collect times are 10 to 20 milliseconds, while inter-dwell times can be half a second, a second, or more. To maintain coherency, one needs to know in the sequence of pulses from the emitter what the pulse number is of a given pulse from the beginning of the collection cycle. When the radar emits pulses at a fixed pulse repetition rate, to identify the number, one has to first estimate the pulse repetition interval, and then project that time across the gap in time when no pulses are arriving to determine how many intervals have elapsed. The number of intervals is added to the pulse number of the last detected pulse before the gap, and the result is the number of the pulse immediately after the gap. Because the time-of-arrival measurements are inexact, projecting the error across a large gap can cause an error in the pulse number of the pulse detected. The remedy for this is to measure time more accurately, or for a given accuracy, to compute the pulse repetition interval more precisely through an averaging process over a number of pulses.

The TOA Geolocation Process

It will be appreciated that if one can ascertain the time that a pulse was in fact emitted from the emitter, and if one measures the time of arrival of that pulse, then one can ascertain as a Doppler or time shift from the original emitted pulse the range from that collector to the emitter. By taking multiple time-of-arrival readings for different collector positions (i.e., creating a "baseleg"), one can determine the exact location of the emitter. The length of the baseleg depends on the geometry and the size of the measurement errors of time and collector position.

Collecting pulses over a baseleg necessitates knowing the number of each pulse (for a constant PRI) with respect to the first one received. For a non-constant PRI, it involves knowing the integer for each pulse associated with Q. By collecting a number of times of arrival of pulses and comparing them to hypothetical times of arrival generated by considering hypothetical emitter locations, one can determine the location of the emitter. An algorithm is provided that finds Q, the integers for each pulse, the time of transmit of each pulse from the emitter, and the geolocation of the emitter.

If one can accurately establish the value of Q, or in the case of a constant pulse repetition interval, the PRI at the emitter, then one can determine a particular location on the surface of the earth that corresponds to the set of times of arrival.

In one embodiment, the system starts out by hypothesizing a trial position for the emitter and a time that the first pulse in the set was emitted. From that and the known positions of the collector when it received pulses in the set, the algorithm generates expected times of arrival of pulses at the collector, for each position of the collector. If the measured times of arrival are sufficiently close to the expected times of arrival, then the position of the emitter is that which was hypothesized.

In practice, one is provided with a rough indication of the location of the emitter either through rough angle-of-arrival measurements or rough range measurements. With a rough guess as to emitter position, one postulates a grid in the form of a swath and then hypothesizes a starting location within the grid.

At the outset, the subject geolocation algorithm establishes a first launching point in the grid, calculates the expected times of arrival of pulses at the various known collector locations and then compares the actual measured times of arrival with those that are expected. If the error between the two is not less than a threshold value, the hypothesized position is driven by a gradient descent method (Newton-Raphson) to a potentially more accurate location for the emitter. If, at any point during a fixed number of iterations of the gradient descent algorithm, the error drops below a predetermined threshold, the hypothesized location of the emitter is the declared location of the emitter. If after the fixed number of iterations, the error is not below threshold, then a new grid box position is used to launch the algorithm and the process is repeated.

Once a location is found that produces TOA errors less than the threshold value, the process ends. For single ship cases, there is no concern that launching the algorithm from a different grid point will yield a different emitter location that satisfies the minimum error criterion and will produce an ambiguity.

Note that one does not need to have the same receiver sensitivity as multi-ship time-difference-of-arrival systems because one does not have to detect every single pulse. The subject system can be as much as 5 dB less sensitive than a time-difference-of-arrival system and still obtain similar or better results.

In summary, a coherent TOA system is provided for rapidly ascertaining the position of a pulse train emitter such as a radar. Techniques are provided to estimate the underlying repetition interval of the emitter and to do the TOA processing knowing which of the particular pulses is being detected at a collector, thus surmounting the effect of gaps in the received pulse stream. The subject system is preferable to conventional time-difference-of-arrival geolocation systems which require that each of the collecting platforms measure the same pulse from the emitter, and also to non-coherent TOA systems whose accuracy is less than that achievable with the subject coherent system for the same amount of data.

BRIEF DESCRIPTION OF THE DRAWINGS

These and other features of the subject invention will be better understood in connection with a Detailed Description, in conjunction with the Drawings, of which:

FIG. 2 is a diagrammatic illustration of the pulse repetition interval between adjacent pulses in a pulse string generated at the pulsed transmitter;

FIG. 3 is a diagrammatic illustration of the measured time of arrival of received pulses for three different collector standoff distances, showing different transit times between the transmitted and received pulses;

FIG. 4 is a formula that is used in geolocating a pulsed emitter;

DETAILED DESCRIPTION

Figure 1:
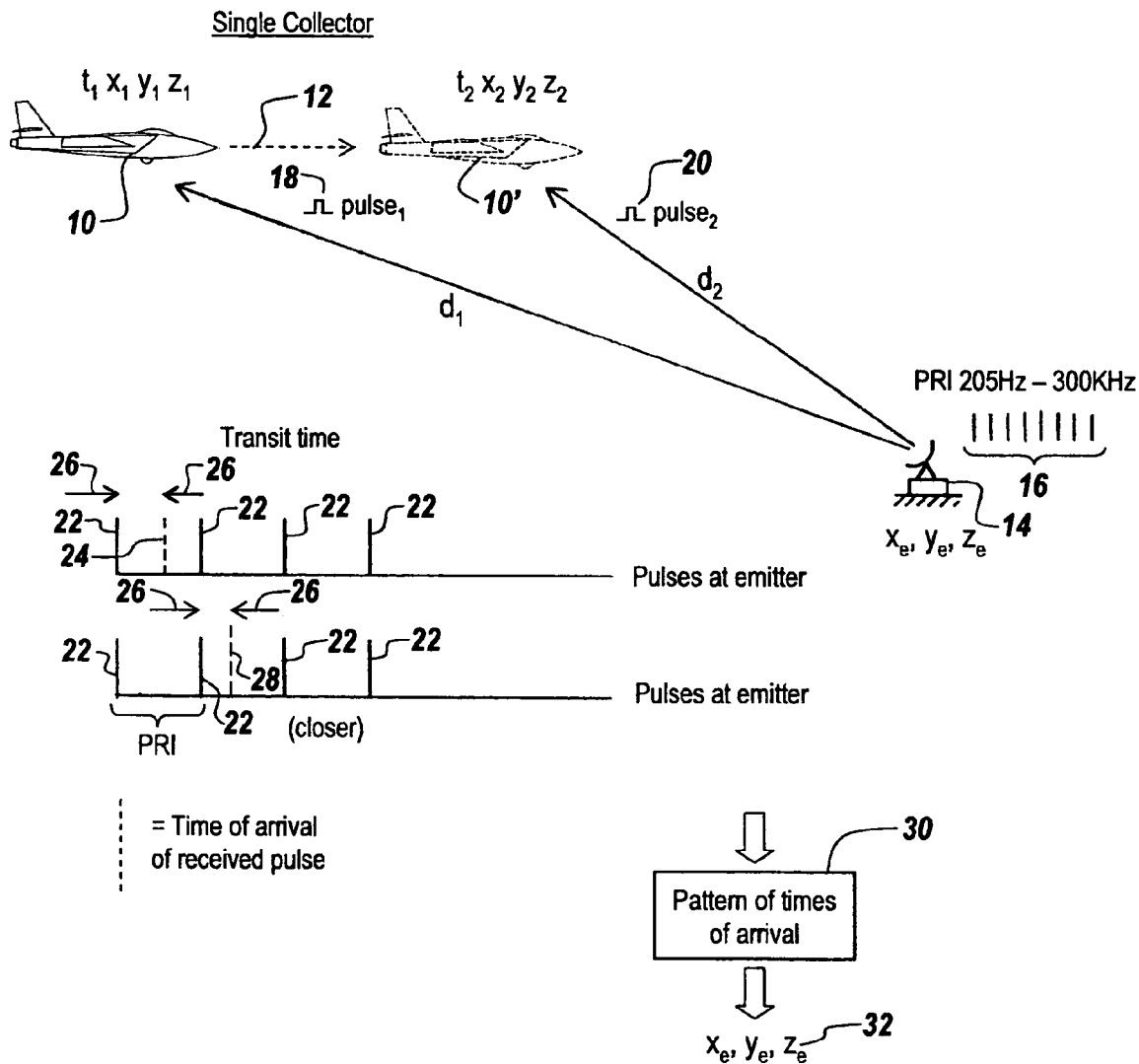
FIG. 1 is a diagrammatic illustration of a single-collector embodiment of the subject invention, showing collection of data at two points along the flight path of an aircraft, with the pattern of changes of pulse-to-pulse intervals resulting in the geolocation of the pulse-emitting source.

Referring now to FIG. 1, in a single-collector embodiment of the subject invention, an aircraft 10 at a position $x_1$, $y_1$, $z_1$ at a time $t_1$ flies along a path 12 so that, as illustrated at 10', it occupies a position $x_2$, $y_2$, $z_2$ at a time $t_2$. It should be noted that the figure shows the arrival of two pulses at the collector. Many more pulses must be collected such that the time to move from the initial location to the final location can be in excess of 30 seconds to establish an adequate baseline between the first pulse collected and the last pulse collected.

An emitter 14 produces a string of pulses 16 at a pulse repetition interval or PRI of between 205 Hz to 300 KHz for typical radars. It is noted that the aircraft when in position 10 is at a distance $d_1$ from emitter 14, whereas when the aircraft is at position 10' it is at a distance $d_2$ from the emitter. Note also that the aircraft at position 10 receives a pulse 18 designated $pulse_1$, whereas at time $t_2$ the collector at position 10' receives a pulse 20 designated $pulse_2$.

For the aircraft at position 10, in the graph below the pulses at the emitter are illustrated at 22, whereas the first pulse in the sequence arrives at the collector at a time of arrival designated by dotted line 24. The time interval between the transmission and receipt of the first pulse is illustrated by double-ended arrows 26.

As can be seen by dotted line 28, when the collector is closer to the emitter, received pulse 28 will arrive in a shorter amount of time than when the collector is a distance $d_1$ from the emitter. This means that as the collector moves closer to the emitter, the interval between received pulses will be shorter than the interval between those pulses at the emitter.

As illustrated at 30, knowing a pattern of changes in the pulse-to-pulse intervals, one can establish the geolocation of the emitter as illustrated at 32.

Here it will be seen that in the single-collector scenario of FIG. 1, the collector does not see the same pulse at two different positions but rather a different pulse. As will be described, it is possible to ascertain which pulse in pulse train 16 pulse 20 is; and for this reason it is possible to accumulate an ensemble of times of arrival at various positions of aircraft 10 as it navigates along path 12. Associated therewith will be a pattern of changes in the pulse-to-pulse intervals for which only one emitter position on the surface of the earth will exist.

As mentioned above, the subject algorithm solves the location not by a direct solution of an equation but rather by postulating the position of the emitter and what set of time-of-arrival results is expected at the various positions of the platform. One thereafter comes up with an error that is minimized by driving the hypothesis to another location.

In operation, assuming that the emitter is fixed at one spot, if one has a flying collector, it receives the first pulse with a certain time of arrival based on its distance from the emitter. The second pulse then comes in when the collector is at a difference distance from the collector and there is an interval between the first two pulses. This is called the inter-pulse interval. The inter-pulse interval is derived from time-of-arrival measurements. Typically, there is a certain fixed interval at which the emitter generates pulses, for instance every 250 microseconds. With the emitter generating the pulses constantly, assuming one is going to receive every pulse, and assuming one is flying a single collector, when one is in one position, one sees a pulse. But when the next pulse comes in, the collector has moved. The collector may have moved a little farther from or a little closer to the radar. If the collector moves closer to the radar, the second pulse is going to come in a little bit sooner than the 250 microseconds between the pulses, i.e., the PRI of the radar. Thus, the system is going to see the second pulse at a time a little bit less than 250 microseconds from the first pulse. Then if for a third pulse the collector moves again to yield a different inter-pulse interval, then the inter-pulse intervals will be changing as the distance from the collectors to the radar gets closer or farther away.

What one therefore obtains is a series of inter-pulse intervals that are changing. One can then generate a pattern of the changes in inter-pulse intervals. This is done by measuring times of arrival and by comparing this pattern to a pattern of times of arrival generated from a hypothesized point. When one compares the measured times of arrival with the expected times of arrival from the hypothesized position, one can develop a number representing error. One can use a gradient descent method to modify the hypothesized location of the emitter to drive the error to zero. When the error becomes sufficiently small, the associated hypothesized location will satisfy all of the times of arrival. This unique spot is identified as the actual emitter location. If the gradient descent algorithm does not converge, then a new point on the grid is selected as a launch point and the process is repeated. Once a solution is found, the process is terminated and no additional grid points are used.

In terms of accuracy, the longer the baseline over which the collector flies, or the more variation in distance to the emitter because of multiple turns, the greater the accuracy of the measurement. With a single ship system flying a straight-line path, one has to fly a fair distance, for instance, several miles, along the baseline to achieve greater accuracy.

Note that if the collector is an antenna on an aircraft, the exact position of the antenna defines the position at which the data is collected. The position of the antenna will vary depending on the orientation of the airplane so that one has to factor in the position of a GPS point on the airplane, roll, pitch and yaw information to be able to accurately calculate where the antenna actually is. To the extent that the positions of a collector are not instantly known, i.e., the so-called navigation messages for the collectors come at different times than the times of arrival of the pulses, one must interpolate the positions of the airplane to the time of arrival of each pulse.

The formula for obtaining the hypothesized time of arrival of a pulse is as follows:

$$TOA = T_0 + \Delta R/C + (n-1)PRI \qquad \text{Equation (1)}$$

Here $\Delta R$ contains the x, y, z emitter location information (unknown) and the location of the aircraft when the pulse is received (known). As can be seen, one needs to know the exact pulse repetition interval (PRI) for the radar. It cannot be assumed, for instance, that the pulse repetition interval of the radar is constant. In point of fact, radar pulse repetition intervals are not always constant. For the subject system to work accurately it is therefore necessary that the pulse-to-pulse interval be quickly ascertainable. It can be shown that there is a quantity Q associated with every radar that provides an estimate of the instantaneous true PRI of that radar.

It is also important to be able to know in a string of pulses which pulse a particular collector is detecting. While it may be impossible to know which is the first pulse from a radar, one can ascertain which pulse is first to arrive at one of a number of collector positions. Then assuming that this is the first pulse, one needs to be able to ascertain what the number of each subsequent pulse is—fifth, seventh, $25^{th}$, et cetera. It can be shown that it is possible to ascertain what the pulse number is as an integer N related to Q, which represents the pulse number.

Given the fact that one can ascertain the pulse repetition interval or a quantity equivalent thereto, one can, through the above-mentioned iterative technique, drive the particular algorithm so as to minimize error, thus to be able to specify the emitter location when the error is below a predetermined threshold.

In the iterative solution to the geolocation problem, a position is first postulated and measurements are taken which are matched with the expected time of arrivals given the postulated position. If one knows that a collector is at a given location and if one postulates the position of the emitter, one can calculate exactly what the times of arrival of the pulses are supposed to be. The question then becomes as to how well the observed set of times of arrival agrees with those that are generated as a result of the postulated position. An error is generated between the times of arrival based on the hypothesized position and the actual measured position, with a Newton-Raphson algorithm utilized to correct the hypothesized position to minimize the error.

It can be shown that in Equation 1 there are 5 unknowns. $T_0$ (the time the first pulse is transmitted from the emitter) is unknown, the x, y, z coordinates of the emitter are unknown and the PRI is unknown. Another parameter that equates to the true PRI, namely Q, is unknown and there is an integer N that identifies what pulse is arriving at a collector. One can know N and can choose a trial value of Q. This value of Q can be refined in the iterative procedure.

Q is selected in an averaging process to correspond to a calculated pulse repetition interval for the pulse trains emitted by emitter 14. As noted hereinabove, radar pulse emitters either vary their PRIs or have a jitter or instability in their pulse trains, so that the pulse repetition interval varies substantially over a period of time.

Referring now to FIG. 2, as mentioned hereinabove the pulse repetition interval of the emitter is critical to the accuracy of the geolocation process. The pulse repetition interval is defined as the interval between transmitter pulses, here show at 76.

Referring to FIG. 3, if one can accurately establish the pulse repetition interval at the emitter, then the time difference between a transmitted pulse 76 and a received pulse 78 establishes the distance $\Delta R_1/C$ between the emitter and the particular collector. As can be seen, for a distance $d_2$ which is closer than $d_1$, $\Delta R_2/C$ as illustrated at 80 is closer in time to transmitted pulse 76 than is received pulse 78 to its corresponding transmitted pulse.

Likewise, for a collector antenna at a distance $d_3$ from the emitter, the received pulse 82 at $d_3$ is received at some time later than the time of the emitted pulse 76. The result is that one can establish $\Delta R_1/C$, $\Delta R_2/C$, $\Delta R_3/C$ et cetera by measuring the times of arrival of pulses at multiple distinct distances from the emitter and comparing with hypothesized arrival times, as described hereinabove.

How the position of the emitter is obtained can be seen by considering the equation of FIG. 4 in which the time of arrival of an ith pulse is computed as a time $T_0 + \Delta R_i/C + (n_i - 1)PRI$. $\Delta R_i$ is the difference between the collector's position (known) and the emitter's position (unknown). $n_i$ (the number of the ith pulse from the first one received in the collect) and the PRI are calculatable. Thus, the equation contains five unknowns: $T_0$; the x, y and z coordinates of the emitter; and the PRI. The PRI is treated as unknown even though an initial guess is provided as a result of determining $n_i$. At least five equations (corresponding to five pulses) would be needed to solve for the unknowns. Since the measurements contain errors, the equation cannot be solved exactly, and the error minimization technique described hereinabove is employed to solve for the unknowns. The initial guess for the PRI was mentioned, the initial guess for the emitter position was described above, and the initial guess for $T_0$ is simply the time of arrival of the first pulse. The Newton-Raphson gradient descent algorithm applied to the differences between TOAs computed by the equation in FIG. 4 and the measured TOAs nudges the values of all five unknowns until a minimum error is found.

Figure 5:
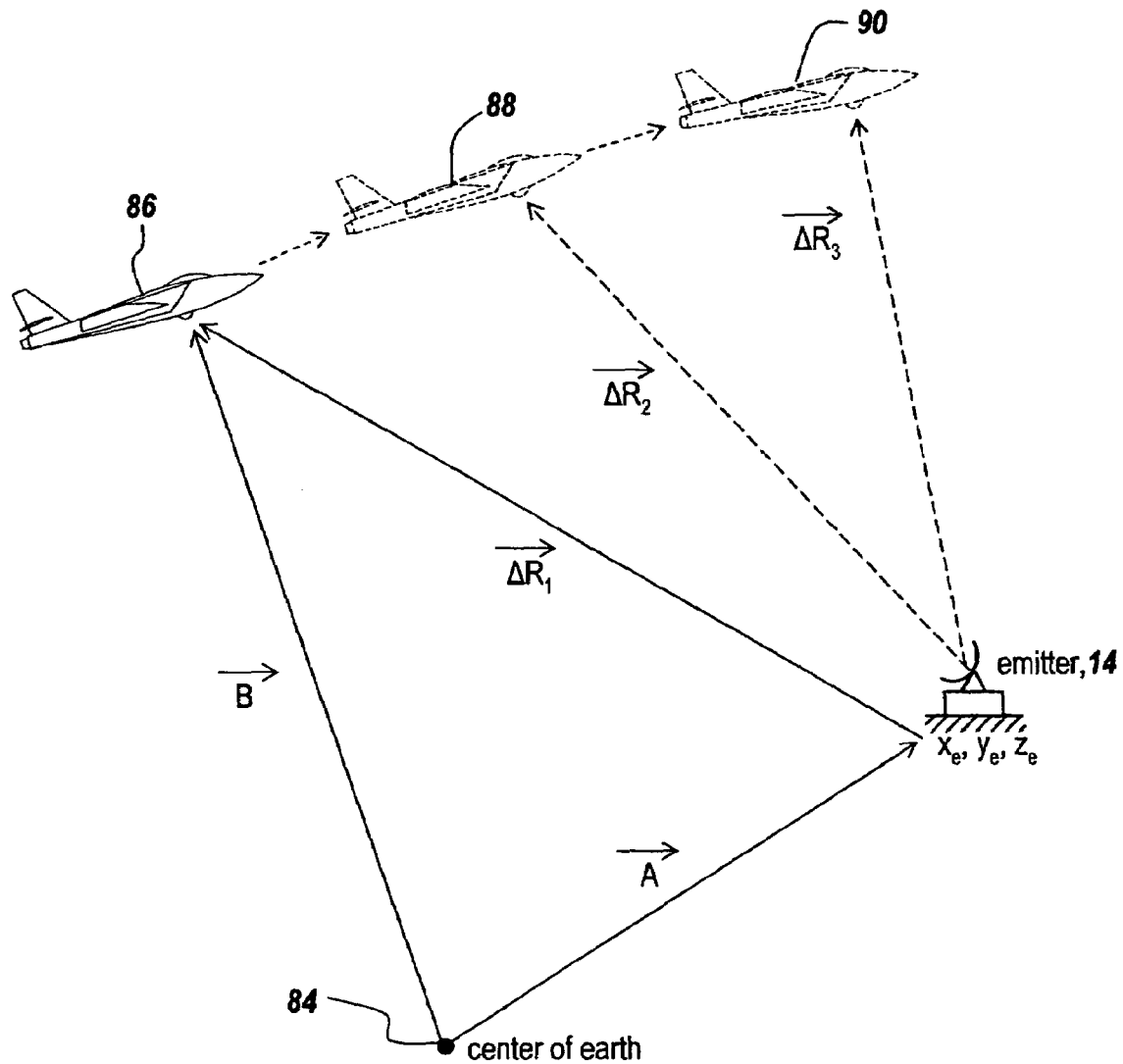
FIG. 5 is a diagrammatic illustration of the geolocation of an emitter in terms of geometry involving vectors $\Delta R_1$, $\Delta R_2$ and $\Delta R_3$, with the vectors referenced to a point at the center of the earth.

Referring to FIG. 5, the geometry involved is shown by referencing all vectors to a common reference, namely the center of the earth as illustrated at 84. Note that collectors on aircraft positions 86, 88 and 90 are at different distances from emitter 14. This is described by vectors $\Delta R_1$, $\Delta R_2$ and $\Delta R_3$. Knowing $\Delta R_1$, $\Delta R_2$, $\Delta R_3$ et cetera, one can derive the emitter position $x_e$, $y_e$, $z_e$.

Figure 6:
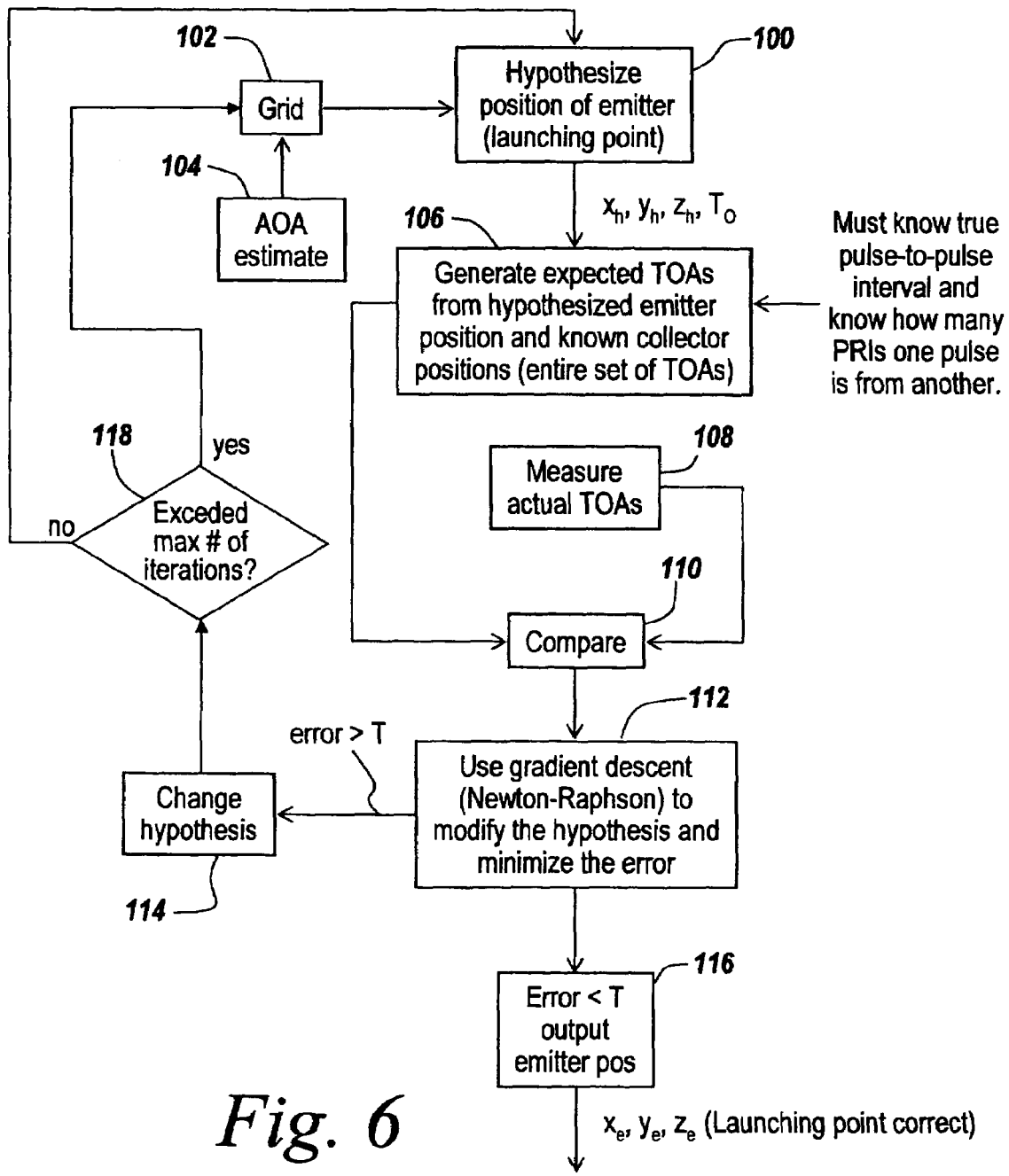
FIG. 6 is a flow chart illustrating the subject processing method for geolocating a pulsed emitter that utilizes a hypothesized position of the emitter as a starting or launching point, the generating of expected times of arrival of pulses based on the hypothesized emitter position given known collector positions, the measurement of actual times of arrival of pulses at the collectors, the comparison of the measured with the hypothesized times of arrival and the use of a gradient descent method to modify the hypothesis to minimize the error between the expected times of arrival and the measured times of arrival; and, FIG. 7 is a diagrammatic illustration of a grid swath generated from rough emitter position data, in which a launching point is located within the grid, with the launching point being modified in accordance with the gradient descent method of FIG. 6 to change the launching point to one which minimizes the error.

Referring now to FIG. 6, in one embodiment of the subject invention one first hypothesizes the position of an emitter as illustrated at 100. This is called the launching point. The hypothesized position of the emitter is established from a grid 102, which is in turn derived from an angle-of-arrival estimate 104 and a coarse range estimate.

The hypothesized position of the emitter is utilized at 106 to generate expected times of arrival of pulses from the hypothesized emitter position given known collector positions. The result is that for a given launching point, unit 106 generates an entire set of hypothesized times of arrival.

As illustrated in 108, one measures actual times of arrival at the various collector positions and at 110 compares the expected times of arrival with the actual times of arrival. The difference is an error which can be reduced as illustrated at 112 utilizing a gradient descent method, the common Newton-Raphson method, to modify the hypothesized position of the emitter to minimize the error between the expected times of arrival and the measured times of arrival. One utilizes the Newton-Raphson technique to change the hypothesis as illustrated 114 so as to change the launching point to one which will result in expected times of arrival more closely approximating the measured times of arrival.

The process is iterative, with the hypothesized emitter location being moved in a direction that minimizes error, up to a maximum number of iterations. When the error in any iteration is less than a predetermined threshold as illustrated at 116, the output is the emitter position, which is the position indicated by the last point selected by the Newton-Raphson algorithm that resulted in the error going below the predetermined threshold. In one embodiment, if the algorithm fails to find a point in a grid box that drives the error below a threshold value or fails to find a stable error in a grid box before exceeding a predetermined maximum number of Newton-Raphson iterations for the grid box as determined by decision box 118, no geolocation answer is output and a different launch point in a different grid box is selected.

In one embodiment, once a launch point yields a satisfactory geolocation solution, the process is terminated and no further grid box launch points are examined. The reason is that the distance that a single ship flies in 30 or 60 seconds (the time scale for the data collection) is not far enough to cause ambiguous solutions to be possible.

Figure 7:
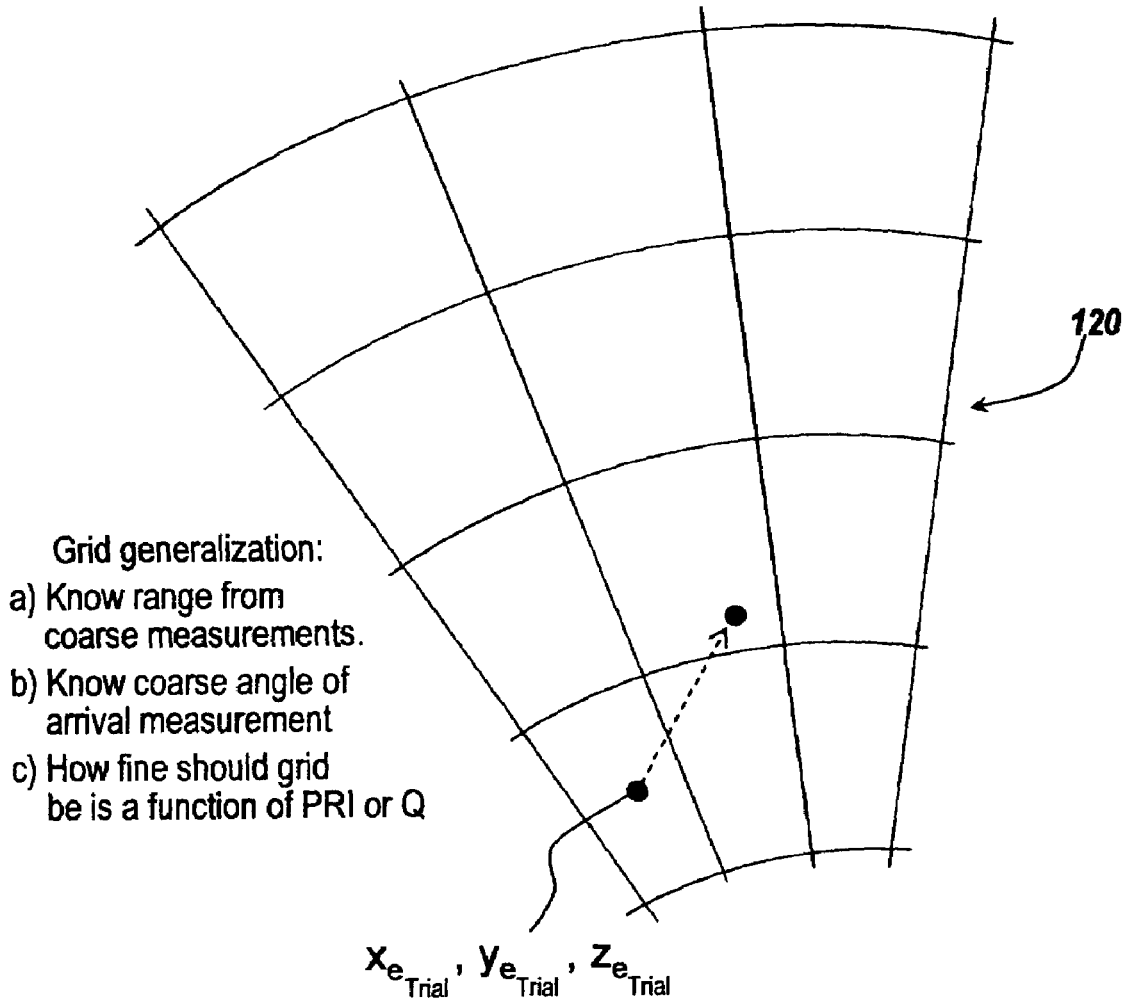

Referring to FIG. 7, in order to set a launching point, one generates a swath grid 120 that is based on coarse range measurements and coarse angles of arrival measurements. How fine the grid is to be is a function of the expected pulse repetition interval or, as mentioned before, Q. Using the above-mentioned gradient descent method the launching point is moved in the grid, and the error is assessed. When the error is below a predetermined threshold, the location of the emitter is known. The above techniques of FIG. 6 are used to allow the Newton-Raphson algorithm to converge by properly selecting launching points which are close enough to the emitter location.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for ascertaining the location of a non-cooperative pulse train emitter initially having an unknown frequency and pulse characteristics, comprising the steps of
collecting pulses from the non-cooperative emitter at a single collector serving as an antenna, the antenna moved to a plurality of locations, such that one moveable antenna and one receiving system are used;
measuring the time of arrival of collected pulses at the plurality of locations using a coherent processing technique; and,
determining from the measured times of arrival of the collected pulses the location of the pulse train emitter.

2. The method of claim 1, wherein the coherent processing includes estimating the pulse repetition interval of the emitter so that accurate times of arrival can be measured.

3. The method of claim 2, wherein the coherent processing includes identifying the pulse number of a pulse received at the collector.

4. The method of claim 3, wherein the coherent processing includes ascertaining the time of emission of the first pulse, the number of pulse repetition intervals from the first pulse and the identity of the pulse number of a collected pulse, thus to minimize the effect of gaps in receipt of emitted pulses at a collector.

5. The method of claim 1, wherein the collecting step includes collectors at spaced-apart locations.

6. The method of claim 1, wherein the location determining step includes hypothesizing an emitter location, for a set of emitted pulses generating expected times of arrival of corresponding pulses at the plurality of locations, comparing measured times of arrival with the expected times of arrival, and identifying the hypothesized emitter location as the actual emitter location when the error between actual and hypothesized times of arrival is less than a predetermined threshold.

7. The method of claim 1, wherein the location determining step includes detecting a set of inter-pulse intervals between two different collector locations and determining from the set of inter-pulse intervals the location of the emitter.

8. A method of improving the accuracy of the geolocation of a pulse train emitter, comprising the steps of coherently determining at a single receiver coupled to a single collector the times of arrival of pulses from the emitter at a plurality of different collector locations using the single collector moved from one location to another; and, determining emitter location from the coherently determined times of arrival of the pulses at the plurality of different collector locations.

9. The method of claim 8, wherein the steps of coherently determining the times of arrival of pulses from the emitter include the step of determining an average pulse repetition interval for the pulses emitted by the emitter.

10. The method of claim 9, wherein the step of coherently determining the times of arrival of the pulses includes ascertaining at a collector location the number of the pulse in the pulse train arriving at the collector.

11. The method of claim 8, wherein the location determining step includes analyzing an ensemble of times of arrival of pulses at different locations.

12. The method of claim 11, wherein the ensemble of times of arrival is the result of collectors at widely spaced-apart locations, thus to establish a long measurement baseline.

13. A method of enhancing the accuracy of a time-of-arrival-based geolocation system for determining the location of a non-cooperative pulse train emitter having initially an unknown frequency and pulse characteristics, comprising the steps of detecting the times of arrival of emitted pulses from the non-cooperative pulse train emitter at a single collector serving as an antenna and moved to different spaced-apart collection locations such that one moveable antenna and one receiving system are used, the receiving system performing coherent processing; and, determining emitter location from an ensemble of times of arrival from the spaced-apart collector locations.

14. The method of claim 13, wherein the collector is located at an aircraft flying along a flight path and further including identifying the location of the collector as the aircraft travels the flight path, the coherent processing making possible data collection over a long flight path to establish a long baseline for enhanced accuracy.

15. A system for ascertaining the location of a non-cooperative pulse train emitter initially having an unknown frequency and pulse characteristics, comprising a single collector for collecting pulses from the emitter, said collector moved to a plurality of locations; and, a single receiver coupled to said single collector including a detector for measuring the time of arrival of said collected pulses at said plurality of locations using coherent processing; and, a processing unit for determining from the measured times of arrival of the collected pulses the location of said pulse train emitter.

16. The system of claim 15, wherein the coherent processing of said detector includes an estimator for estimating the pulse repetition interval of the emitter so that accurate times of arrival can be measured.

17. The system of claim 16, wherein the coherent processing of said detector includes a pulse number identifier for identifying the pulse number of a pulse received at said collector.

18. The system of claim 17, wherein said coherent processing includes a unit for ascertaining the time of emission of a first pulse in said pulse train arriving at said collector at a collector location, the number of pulse repetition intervals from said first pulse and the pulse number of a pulse arriving at said collector after said first pulse, thus to permit minimizing the effect of gaps in receipt of emitted pulses at said collector.

19. The system of claim 15, wherein said processing unit determines the location of said pulse train emitter using a pattern of inter-pulse intervals of pulses received at different collector locations based on times of arrival of said received pulses.

* * * * *